(12) United States Patent
Frost

(10) Patent No.: US 10,617,209 B1
(45) Date of Patent: Apr. 14, 2020

(54) RAIL MOUNTABLE SLIDING SHELF ASSEMBLY

(71) Applicant: Mike Frost, Oakhurst, CA (US)

(72) Inventor: Mike Frost, Oakhurst, CA (US)

( * ) Notice: Subject to any disclaimer, the term of this patent is extended or adjusted under 35 U.S.C. 154(b) by 0 days.

(21) Appl. No.: 16/156,758

(22) Filed: Oct. 10, 2018

(51) Int. Cl.
*A47B 96/06* (2006.01)
*F16B 45/00* (2006.01)
*F16B 2/12* (2006.01)
*A47B 96/02* (2006.01)

(52) U.S. Cl.
CPC ............ *A47B 96/06* (2013.01); *A47B 96/021* (2013.01); *F16B 2/12* (2013.01); *F16B 45/00* (2013.01)

(58) Field of Classification Search
CPC ....... A47B 96/06; A47B 96/021; A47B 37/04; A47B 13/003; A47B 2013/006; F16B 2/12; F16B 45/00; E04H 17/1417; E04H 2017/006
See application file for complete search history.

(56) References Cited

U.S. PATENT DOCUMENTS

| | | | | |
|---|---|---|---|---|
| 2,797,973 A * | 7/1957 | Culpepper | ............... | A47C 7/68 108/157.11 |
| 3,433,443 A | 3/1969 | Mangan | | |
| 4,570,803 A | 2/1986 | Peterson | | |
| 4,889,057 A * | 12/1989 | Chartrand | ............... | A47B 5/04 108/42 |
| D318,390 S | 7/1991 | Murray | | |
| 5,240,214 A * | 8/1993 | Birnbaum | ............... | A47G 7/044 248/214 |
| D419,021 S | 1/2000 | Owens | | |
| 6,059,300 A * | 5/2000 | Wu | ............ | B62B 1/08 248/229.11 |
| 6,082,270 A * | 7/2000 | Zerger | ................... | B60N 3/001 108/42 |
| 6,546,879 B1 | 4/2003 | Johnston | | |
| 7,121,213 B2 * | 10/2006 | Viazanko | ................. | A47B 5/02 108/42 |
| 8,336,837 B2 * | 12/2012 | Gephart | .................... | F16B 2/12 248/218.4 |
| 8,915,197 B2 * | 12/2014 | Raml | ....................... | A47B 5/00 108/152 |
| 9,637,921 B1 * | 5/2017 | Bollman | ................... | E04C 3/04 |
| 10,130,166 B1 * | 11/2018 | Prokopovich | ............ | A47B 3/06 |
| 10,280,961 B1 * | 5/2019 | Bollman | ................ | A47B 13/06 |
| 2007/0034758 A1 * | 2/2007 | Bates | .................. | E04H 12/2276 248/218.4 |
| 2007/0101908 A1 * | 5/2007 | Makita | ..................... | A47B 5/02 108/47 |
| 2009/0000523 A1 * | 1/2009 | Ciardelli | ................ | A47B 37/04 108/42 |

(Continued)

*Primary Examiner* — Hanh V Tran

(57) ABSTRACT

A rail mountable sliding shelf assembly for supporting a grill and other articles includes a first plate. A plurality of brackets is coupled to a lower face of the first plate. Each bracket extends from proximate to a rear edge to proximate to a front edge of the first plate. Each of a plurality of couplers is configured to couple to a rail of a railing and to slidably couple to a respective bracket. The first plate is substantially perpendicular to the railing and the rear edge of the first plate is selectively positionable proximate to and distal from the rail. The first plate is configured to position an article of a user, such as a grill and a tackle box.

15 Claims, 6 Drawing Sheets

(56) References Cited

U.S. PATENT DOCUMENTS

| | | | |
|---|---|---|---|
| 2009/0020047 A1* | 1/2009 | Noble | A47B 5/02 108/157.1 |
| 2014/0130719 A1* | 5/2014 | Raml | A47B 5/00 108/42 |
| 2016/0113390 A1* | 4/2016 | Dias | A47B 5/02 108/25 |
| 2016/0227944 A1* | 8/2016 | Gonzalez | A47B 57/565 |
| 2016/0281917 A1* | 9/2016 | Murphy | A47B 96/06 |
| 2016/0289991 A1* | 10/2016 | Prewitt | E04F 10/0666 |
| 2016/0305459 A1* | 10/2016 | Park | F16B 5/0685 |
| 2016/0325197 A1* | 11/2016 | Smith | A63H 33/006 |
| 2016/0353877 A1* | 12/2016 | Brus | A47B 5/02 |
| 2017/0042329 A1* | 2/2017 | Rollins | A47B 96/021 |
| 2017/0310023 A1* | 10/2017 | Trombley | H01R 4/46 |
| 2018/0340333 A1* | 11/2018 | Hirth | F16B 2/12 |

* cited by examiner

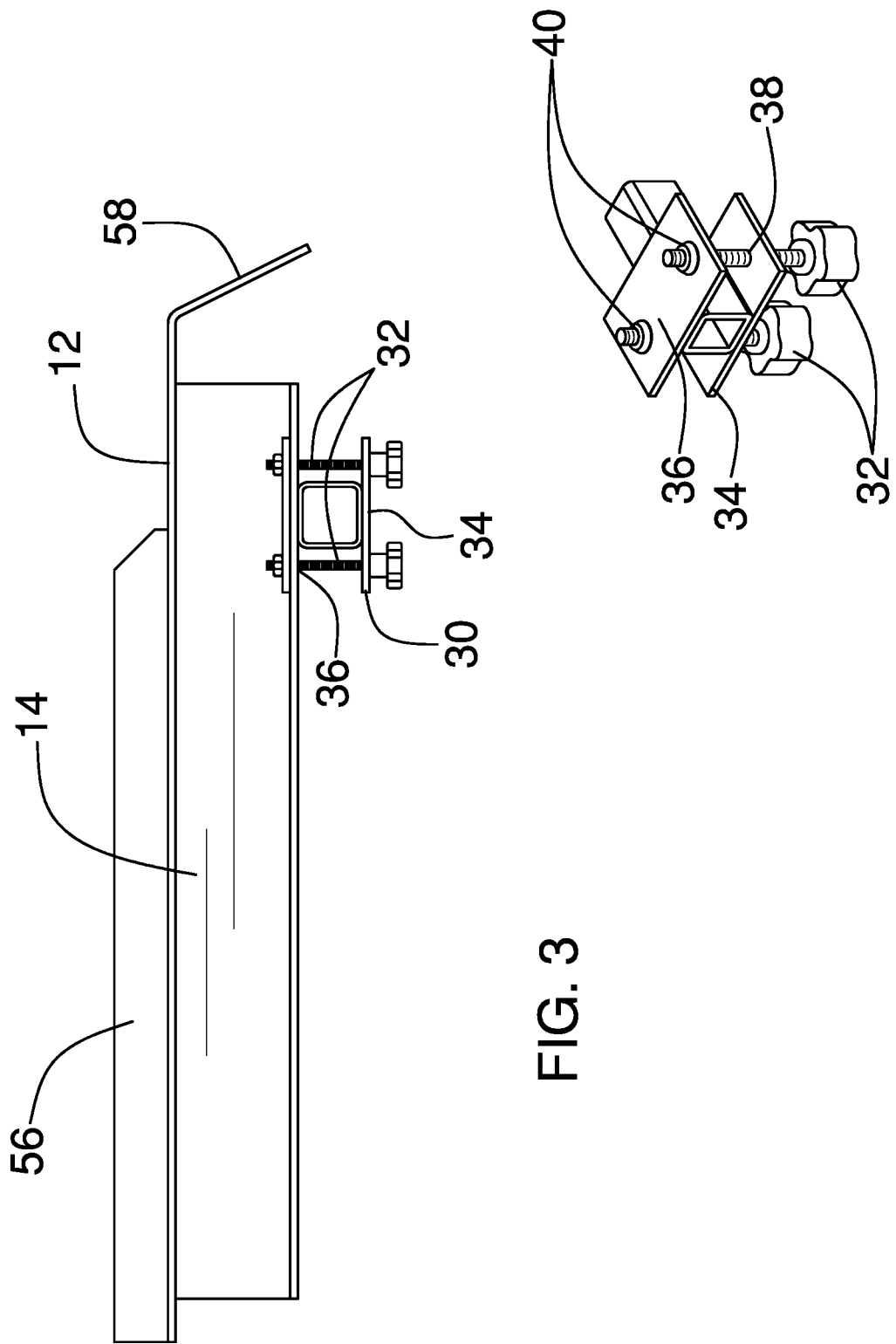

RAIL MOUNTABLE SLIDING SHELF ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relate to shelf assemblies and more particularly pertains to a new shelf assembly for supporting a grill and other articles.

BRIEF SUMMARY OF THE INVENTION

An embodiment of the disclosure meets the needs presented above by generally comprising a first plate. A plurality of brackets is coupled to a lower face of the first plate. Each bracket extends from proximate to a rear edge to proximate to a front edge of the first plate. Each of a plurality of couplers is configured to couple to a rail of a railing and to slidably couple to a respective bracket. The first plate is substantially perpendicular to the railing and the rear edge of the first plate is selectively positionable proximate to and distal from the rail. The first plate is configured to position an article of a user, such as a grill and a tackle box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is an end view of an embodiment of the disclosure.

FIG. 4 is an isometric perspective view of an embodiment of the disclosure.

DETAILED DESCRIPTION OF THE INVENTION

Figure 1:
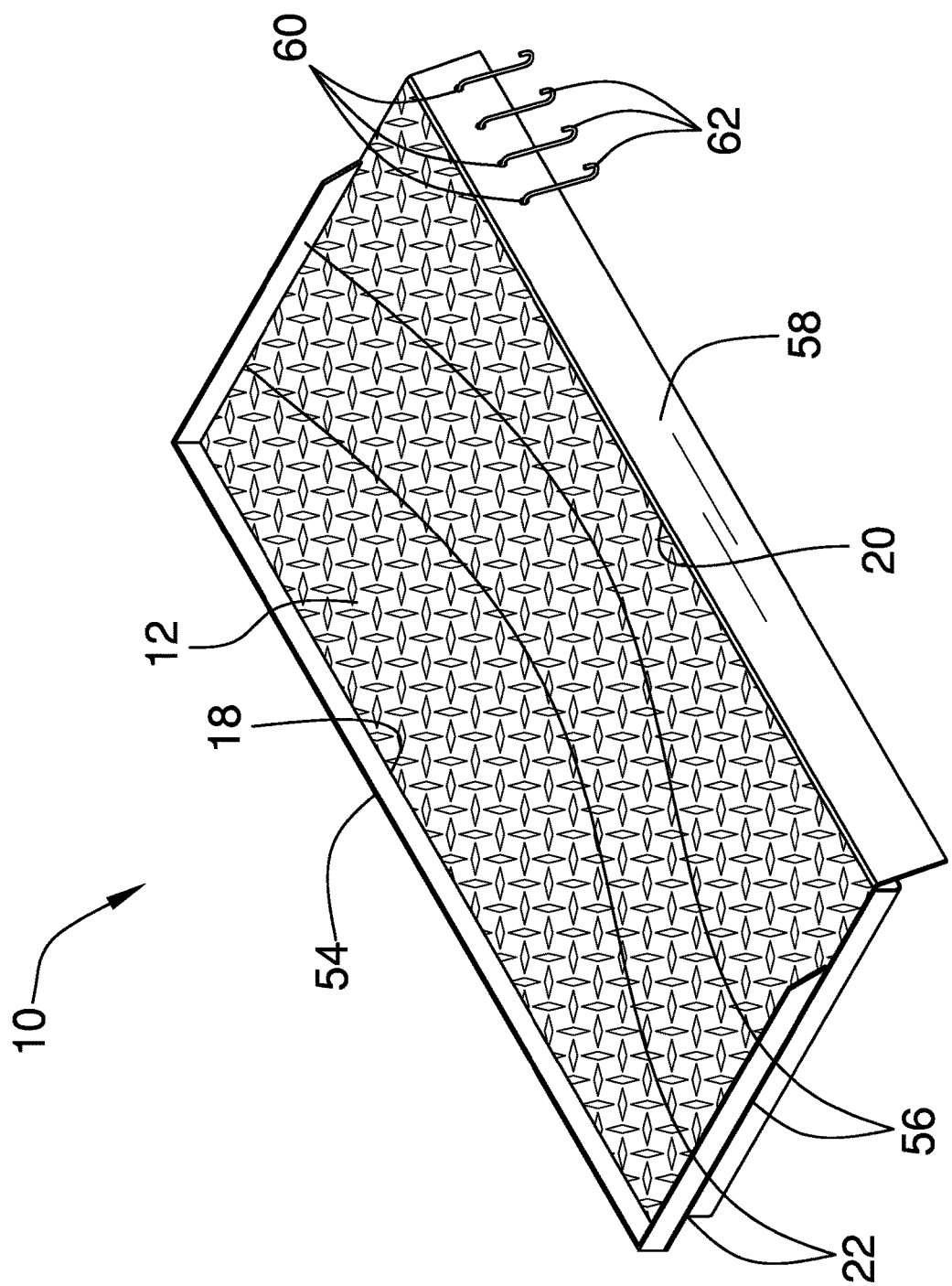
FIG. 1 is an isometric perspective view of a rail mountable sliding shelf assembly according to an embodiment of the disclosure.
Figure 2:
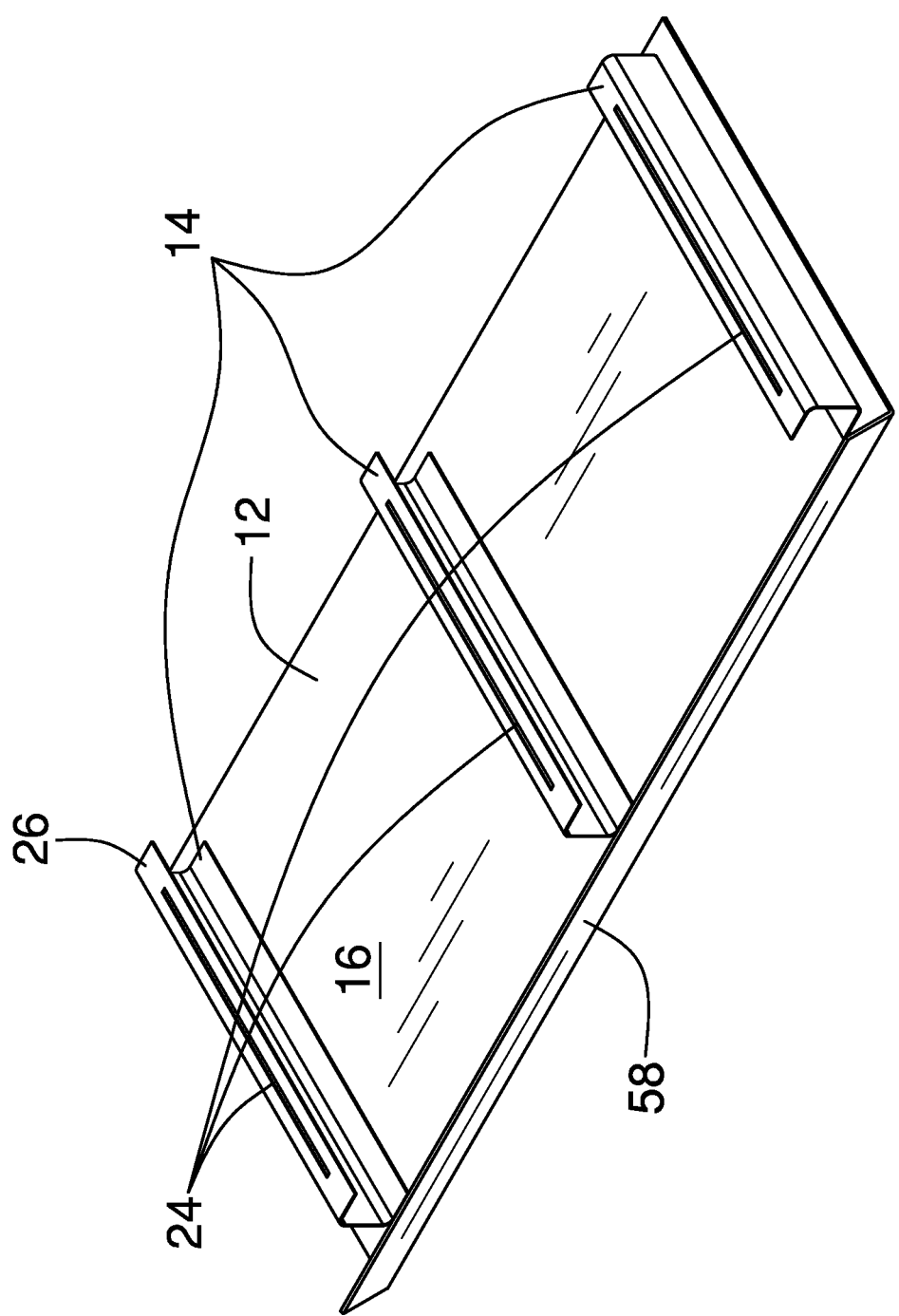
FIG. 2 is an isometric perspective view of an embodiment of the disclosure.

With reference now to the drawings, and in particular to FIGS. 1 through 8 thereof, a new shelf assembly embodying the principles and concepts of an embodiment of the disclosure and generally designated by the reference numeral 10 will be described.

As best illustrated in FIGS. 1 through 8, the rail mountable sliding shelf assembly 10 generally comprises a first plate 12 that is rectangularly shaped. The first plate 12 comprises metal and is diamond-plate type. The first plate 12 comprises at least one of aluminum and stainless steel. Aluminum is particularly suitable for fresh water environments, while stainless steel is suitable for both fresh water environments and salt water environments.

A plurality of brackets 14 is coupled to a lower face 16 of the first plate 12. Each bracket 14 extends from proximate to a rear edge 18 to proximate to a front edge 20 of the first plate 12. The plurality of brackets 14 comprises three brackets 14 that are positioned singly proximate to opposing ends 22 of the first plate 12 and substantially equally distant from the opposing ends 22. The brackets 14 are C-channel type and comprise metal. The brackets 14 comprise at least one of aluminum and stainless steel.

Each of a plurality of slots 24 is positioned in a surface 26 of a respective bracket 14 distal from the first plate 12. The slot 24 extends from proximate to opposing endpoints 28 of the bracket 14.

Each of a plurality of couplers 30 is configured to couple to a rail of a railing and to slidably couple to a respective bracket 14. The first plate 12 is positioned substantially perpendicularly to the railing and the rear edge 18 of the first plate 12 is selectively positionable proximate to and distal from the rail. The first plate 12 is configured to position an article of a user, such as a grill and a tackle box. With the couplers 30 coupled to a rail of a boat, the first plate 12 can be extended from the rail over a side of the boat, allowing the user to position the first plate 12 and the article out of the way of the user. Upon docking, the first plate 12 can be extended over the interior of the boat.

Each coupler 30 comprises a pair of thumbscrews 32, a second plate 34, and a third plate 36. The thumbscrews 32 are snap-lock type. The second plate 34 and the third plate 36 are rectangularly shaped. A pair of second plate holes 38 is positioned through the second plate 34. Each second plate hole 38 and a respective slot 24 are positioned to selectively insert a respective thumbscrew 32 so that the pair of thumbscrews 32 brackets the rail of the railing. A pair of third plate holes 40 is positioned through the third plate 36. The third plate holes 40 are threaded so that the third plate holes 40 are complementary to the thumbscrews 32. Each third plate 36 is selectively positionable on a respective bracket 14 so that the pair of third plate holes 40 is aligned with the respective slot 24. Each third plate hole 40 is positioned to threadedly insert a respective thumbscrew 32 to couple the bracket 14 to the rail. This configuration is particularly suitable for coupling the bracket 14 to a rail that has either a rectangular or square cross-sectional profile, as shown in FIG. 4.

Figure 5:
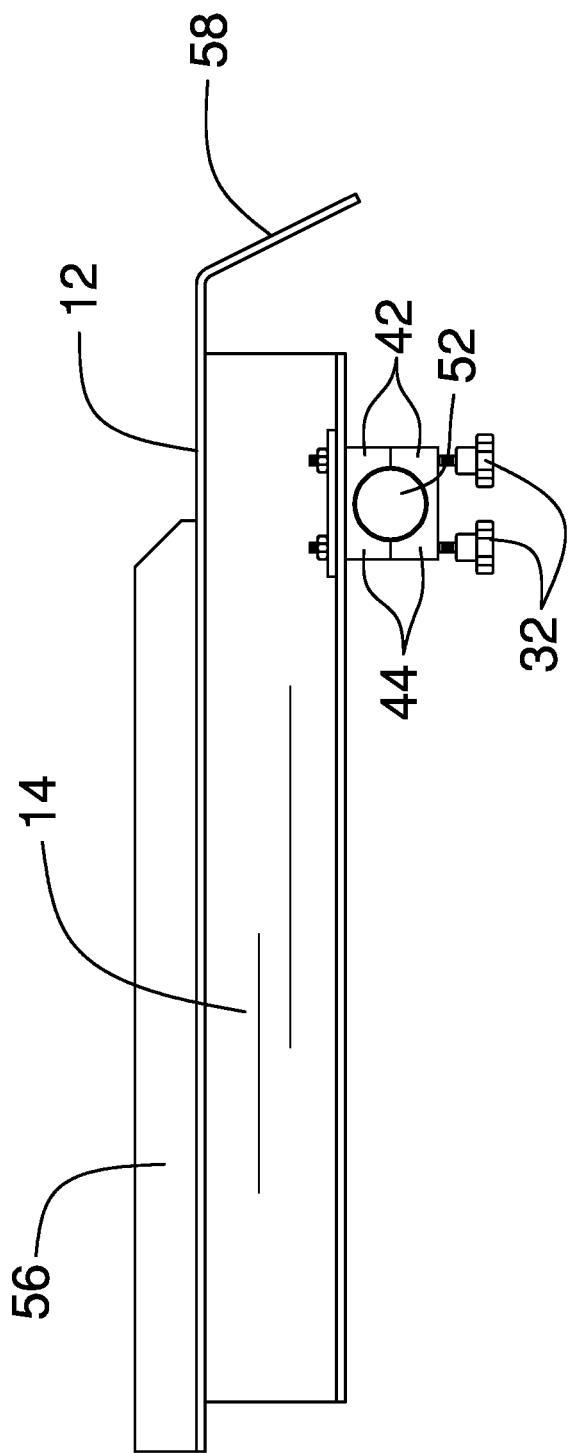
FIG. 5 is an end view of an embodiment of the disclosure.
Figure 6:
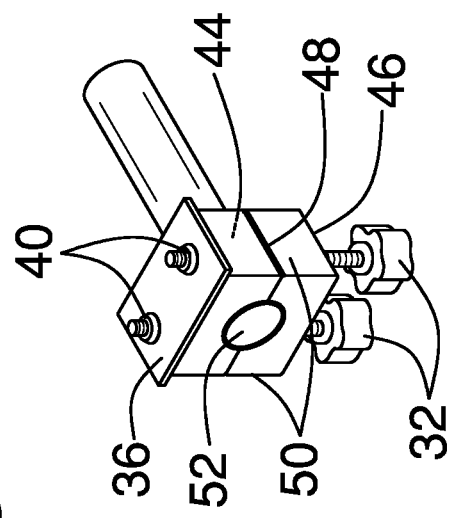
FIG. 6 is an isometric perspective view of an embodiment of the disclosure.
Figure 7:
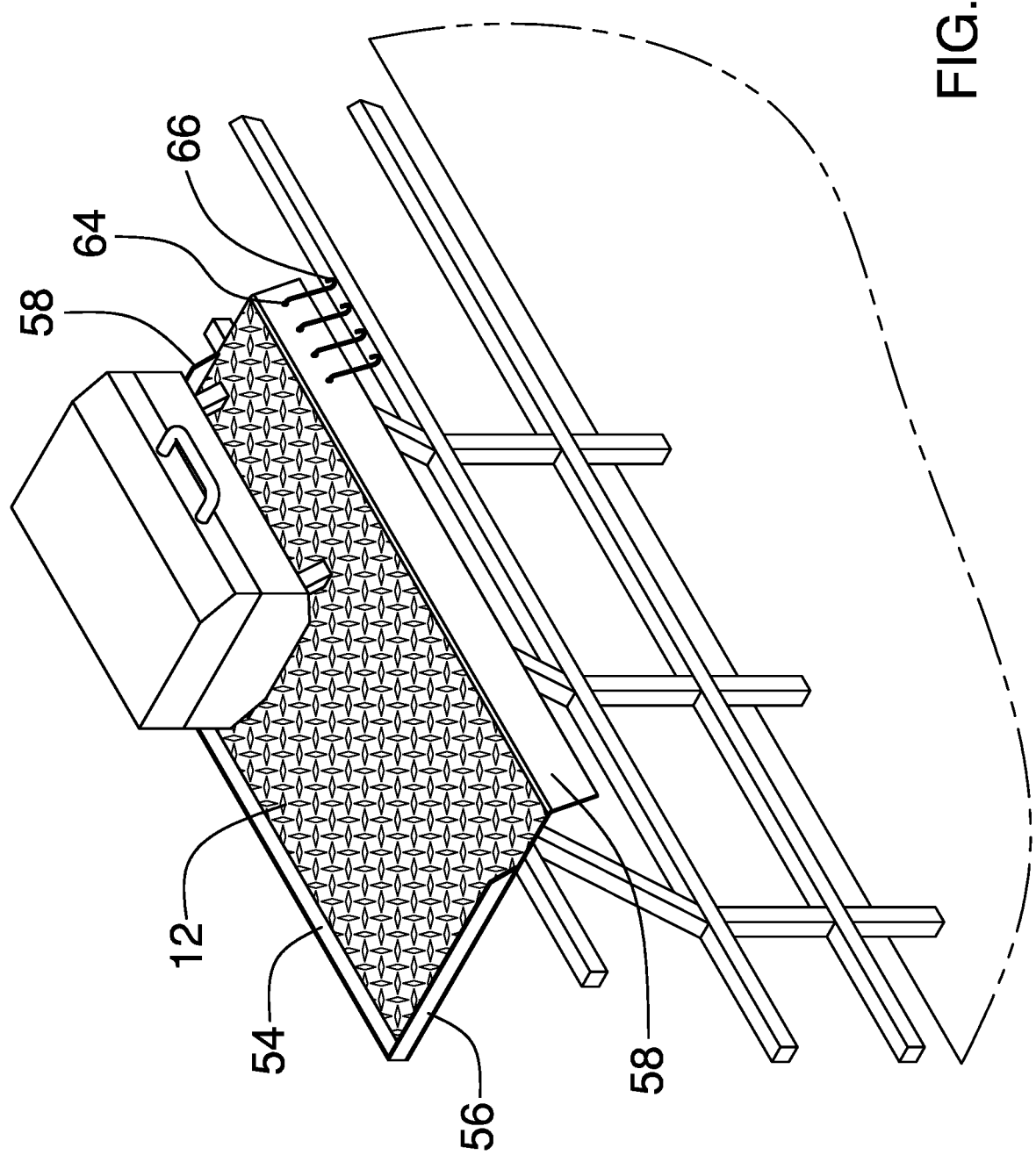
FIG. 7 is an in-use view of an embodiment of the disclosure.
Figure 8:
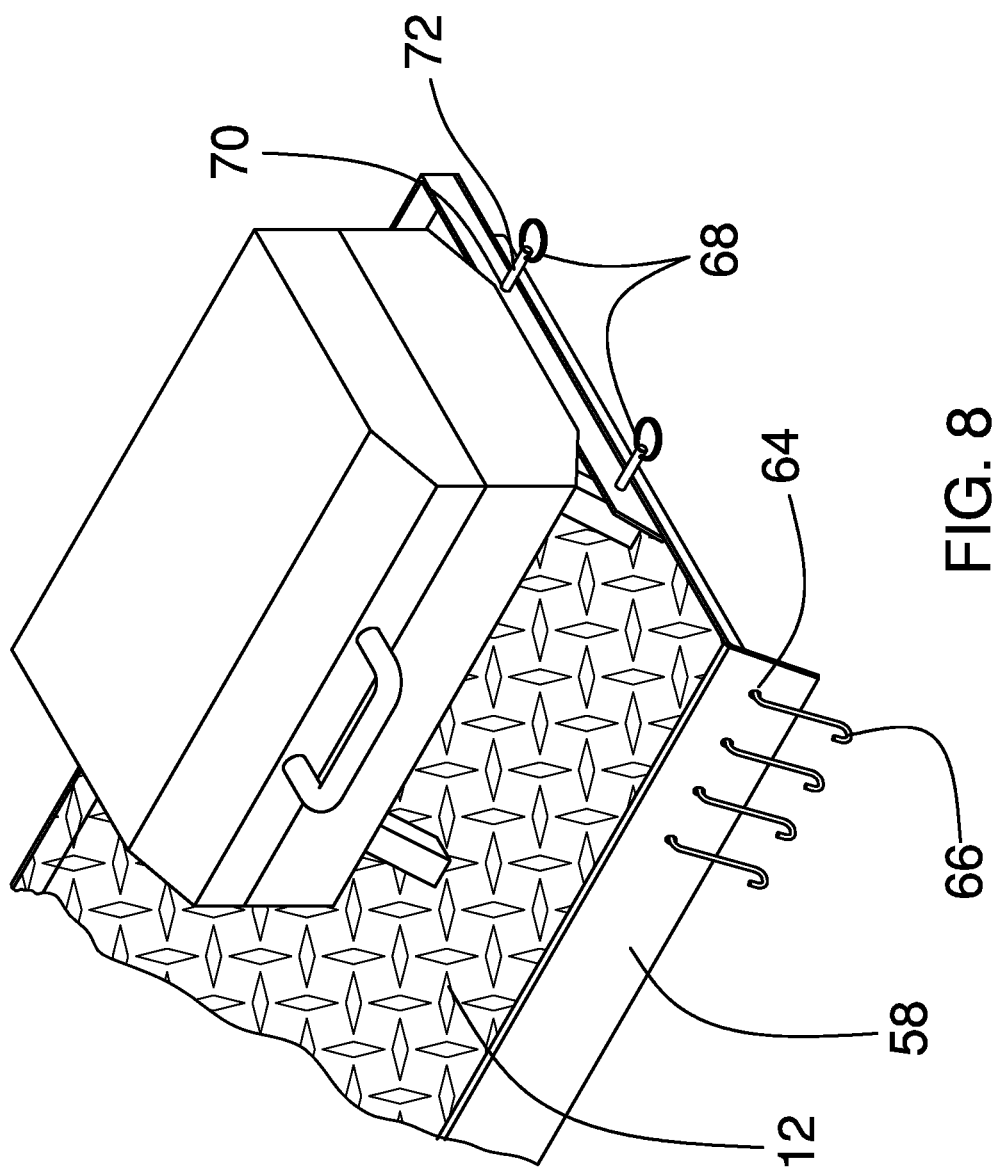
FIG. 8 is an in-use view of an embodiment of the disclosure.

Each coupler 30 also comprises a pair of adapters 42, as shown in FIG. 5. Each adapter 42 is substantially rectangularly box shaped. Each adapter 42 comprises a pair of first channels 44. Each first channel 44 extends from a top 46 to a bottom 48 of the adapter 42 proximate to a respective opposing side face 50 of the adapter 42. Each first channel 44 is positioned to insert a respective thumbscrew 32. A second channel 52 extends into the bottom 48 of the adapter 42 equally distant from the opposing side faces 50. The second channel 52 is semi-circularly shaped when viewed longitudinally so that the second channels 52 are complementary to a round rail. Positioning of the pair of adapters 42 between the second plate 34 and the third plate 36 positions the thumbscrews 32 to couple the pair of adapters 42 to the round rail, as shown in FIG. 6.

For repositioning the first plate 12 relative to the rail, the thumbscrews 32 are loosened, allowing the brackets 14 and the first plate 12 to be slid relative to the rail with the slot 24 allowing passage of the thumbscrews 32. If desired, the thumbscrews 32 can be further loosened, allowing the first plate 12 to be rotated so that it is substantially perpendicular from the railing to stow the first plate 12 when not in use.

A rear lip 54 is coupled to and extends substantially perpendicularly from the rear edge 18 of the first plate 12. Each of a pair of side lips 56 is coupled to and extends substantially perpendicularly from a respective opposing end 22 of the first plate 12. The side lip 56 extends from the rear lip 54 to proximate to the front edge 20. The side lip 56 is beveled proximate to the front edge 20. The rear lip 54 and the side lips 56 are configured to retain the article on the first plate 12.

A panel 58 is coupled to and extends transversely from the front edge 20 of the plate. A plurality of panel holes 60 positioned through the panel 58. The plurality of panel holes 60 comprises four panel holes 60 that are positioned in the panel 58 proximate to a respective opposing end 22 of the first plate 12. Each of a plurality of S-hooks 62 has a first end 64 that is positioned through a respective panel hole 60 to couple the S-hook 62 to the panel 58. A second end 66 of the S-hook 62 is configured to selectively couple to an item of the user, such as a grilling accessory, to couple the item to the panel 58.

A pair of fasteners 68 is coupled to a respective side lip 56. The fasteners 68 are configured to couple to the article, such as the gill, that is positioned on the first plate 12 to fixedly position the article on the upper surface. Each fastener 68 comprises an orifice 70 and a pin 72. The orifice 70 is positioned through the respective side lip 56. The pin 72 is quick-release type and is selectively insertable through the orifice 70 and an associated aperture that is positioned through an element of the article, such as a leg of the grill. For semi-permanent mounting of the grill to the first plate 12, the user can bolt the grill to the respective side lip 56 utilizing the orifice 70.

In use, the thumbscrews 32 are loosened, allowing the brackets 14 and the first plate 12 to be slid relative to the rail so that the first plate 12 is positioned over the side of the boat. The thumbscrews 32 then are tightened to fixedly positioned the brackets 14 and the first plate 12 relative to the rail. The grill is positioned on the first plate 12 for use.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A rail mountable sliding shelf assembly comprising:
   a first plate;
   a plurality of brackets coupled to a lower face of the first plate, each bracket extending from proximate to a rear edge to proximate to a front edge of the first plate;
   a plurality of couplers, each coupler being configured for coupling to a rail of a railing and for slidably coupling to a respective bracket such that the rear edge of the first plate is selectively positionable proximate to and distal from the rail and such that the first plate is substantially perpendicular to the railing wherein the first plate is configured for positioning an article of a user;
   a rear lip coupled to and extending substantially perpendicularly from the rear edge of the first plate;
   a pair of side lips, each side lip being coupled to and extending substantially perpendicularly from a respective opposing end of the first plate, the side lip extending from the rear lip to proximate to the front edge, the side lip being beveled proximate to the front edge wherein the rear lip and the side lips are configured for retaining the article on the first plate; and
   a pair of fasteners coupled to a respective side lip, the fasteners being configured for coupling to the article positioned on the first plate for fixedly positioning the article on the first plate.

2. The assembly of claim 1, further including the first plate being rectangularly shaped.

3. The assembly of claim 1, further including the first plate being diamond-plate type.

4. The assembly of claim 1, further including the plurality of brackets comprising three brackets positioned singly proximate to opposing ends of the first plate and substantially equally distant from the opposing ends.

5. The assembly of claim 1, further including the brackets being C-channel type.

6. The assembly of claim 1, further including the first plate and the brackets comprising metal.

7. The assembly of claim 6, further including the first plate and the brackets comprising at least one of aluminum and stainless steel.

8. The assembly of claim 1, further including a plurality of slots, each slot being positioned in a surface of a respective bracket distal from the first plate, the slot extending from proximate to opposing endpoints of the bracket.

9. The assembly of claim 1, further comprising:
a panel coupled to and extending transversely from the front edge of the first plate;
a plurality of panel holes positioned through the panel; and
a plurality of S-hooks, each S-hook having a first end positioned through a respective panel hole for coupling the S-hook to the panel wherein a second end of the S-hook is configured for selectively coupling to an item of the user for coupling the item to the panel.

10. The assembly of claim 9, further including the plurality of panel holes comprising four panel holes positioned in the panel proximate to a respective opposing end of the first plate.

11. The assembly of claim 1, further including each fastener comprising:
an orifice positioned through the respective side lip; and
a pin, the pin being quick-release type, the pin being selectively insertable through the orifice and an associated aperture positioned through an element of the article.

12. A rail mountable sliding shelf assembly comprising:
a first plate;
a plurality of brackets coupled to a lower face of the first plate, each bracket extending from proximate to a rear edge to proximate to a front edge of the first plate;
a plurality of slots, each slot being positioned in a surface of a respective bracket distal from the first plate, the slot extending from proximate to opposing endpoints of the bracket; and
a plurality of couplers, each coupler being configured for coupling to a rail of a railing and for slidably coupling to a respective bracket such that the rear edge of the first plate is selectively positionable proximate to and distal from the rail and such that the first plate is substantially perpendicular to the railing wherein the first plate is configured for positioning an article of a user, each coupler comprising:
a pair of thumbscrews;
a second plate, the second plate being rectangularly shaped;
a pair of second plate holes positioned through the second plate wherein each second plate hole and a respective slot are positioned for selectively inserting a respective thumbscrew such that the pair of thumbscrews brackets the rail of the railing;
a third plate, the third plate being rectangularly shaped; and
a pair of third plate holes positioned through the third plate, the third plate holes being threaded such that the third plate holes are complementary to the thumbscrews wherein each third plate is selectively positionable on a respective bracket such that the pair of third plate holes is aligned with the respective slot positioning each third plate hole for threadedly inserting a respective thumbscrew for coupling the bracket to the rail.

13. The assembly of claim 12, further including the thumbscrews being snap-lock type.

14. The assembly of claim 12, further including a pair of adapters, each adapter being substantially rectangularly box shaped, each adapter comprising:
a pair of first channels, each first channel extending from a top to a bottom of the adapter proximate to a respective opposing side face of the adapter wherein each first channel is positioned for inserting a respective thumbscrew, and
a second channel extending into the bottom of the adapter equally distant from the opposing side faces, the second channel being semi-circularly shaped when viewed longitudinally such that the second channels are complementary to a round rail wherein positioning of the pair of adapters between the second plate and the third plate positions the thumbscrews for coupling the pair of adapters to the round rail.

15. A rail mountable sliding shelf assembly comprising:
a first plate, the first plate being rectangularly shaped, the first plate comprising metal, the first plate being diamond-plate type, the first plate comprising at least one of aluminum and stainless steel;
a plurality of brackets coupled to a lower face of the first plate, each bracket extending from proximate to a rear edge to proximate to a front edge of the first plate, the plurality of brackets comprising three brackets positioned singly proximate to opposing ends of the first plate and substantially equally distant from the opposing ends, the brackets being C-channel type, the brackets comprising metal, the brackets comprising at least one of aluminum and stainless steel;
a plurality of slots, each slot being positioned in a surface of a respective bracket distal from the first plate, the slot extending from proximate to opposing endpoints of the bracket;
a plurality of couplers, each coupler being configured for coupling to a rail of a railing and for slidably coupling to a respective bracket such that the rear edge of the first plate is selectively positionable proximate to and distal from the rail and such that the first plate is substantially perpendicular to the railing wherein the first plate is configured for positioning an article of a user, each coupler comprising:
a pair of thumbscrews, the thumbscrews being snap-lock type,
a second plate, the second plate being rectangularly shaped,
a pair of second plate holes positioned through the second plate wherein each second plate hole and a respective slot are positioned for selectively inserting a respective thumbscrew such that the pair of thumbscrews brackets the rail of the railing,
a third plate, the third plate being rectangularly shaped,
a pair of third plate holes positioned through the third plate, the third plate holes being threaded such that the third plate holes are complementary to the thumbscrews wherein each third plate is selectively positionable on a respective bracket such that the pair of third plate holes is aligned with the respective slot positioning each third plate hole for threadedly inserting a respective thumbscrew for coupling the bracket to the rail,
  a pair of adapters, each adapter being substantially rectangularly box shaped, each adapter comprising:
    a pair of first channels, each first channel extending from a top to a bottom of the adapter proximate to a respective opposing side face of the adapter wherein each first channel is positioned for inserting a respective thumbscrew, and
    a second channel extending into the bottom of the adapter equally distant from the opposing side faces, the second channel being semi-circularly shaped when viewed longitudinally such that the second channels are complementary to a round rail wherein positioning of the pair of adapters between the second plate and the third plate positions the thumbscrews for coupling the pair of adapters to the round rail;
a rear lip coupled to and extending substantially perpendicularly from the rear edge of the first plate;
a pair of side lips, each side lip being coupled to and extending substantially perpendicularly from a respective opposing end of the first plate, the side lip extending from the rear lip to proximate to the front edge, the side lip being beveled proximate to the front edge wherein the rear lip and the side lips are configured for retaining the article on the first plate;
a panel coupled to and extending transversely from the front edge of the first plate;
a plurality of panel holes positioned through the panel, the plurality of panel holes comprising four panel holes positioned in the panel proximate to a respective opposing end of the first plate;
a plurality of S-hooks, each S-hook having a first end positioned through a respective panel hole for coupling the S-hook to the panel wherein a second end of the S-hook is configured for selectively coupling to an item of the user for coupling the item to the panel; and
a pair of fasteners coupled to a respective side lip, the fasteners being configured for coupling to the article positioned on the first plate for fixedly positioning the article on the first plate, each fastener comprising:
  an orifice positioned through the respective side lip; and
  a pin, the pin being quick-release type, the pin being selectively insertable through the orifice and an associated aperture positioned through an element of the article.

\* \* \* \* \*